United States Patent
Li et al.

(10) Patent No.: US 9,298,760 B1
(45) Date of Patent: Mar. 29, 2016

(54) METHOD FOR SHARD ASSIGNMENT IN A LARGE-SCALE DATA PROCESSING JOB

(75) Inventors: Xiaozhou Li, Cupertino, CA (US); Yonggang Zhao, San Mateo, CA (US); Marian Dvorsky, Sunnyvale, CA (US); Ovidiu Gheorghioiu, San Francisco, CA (US)

(73) Assignee: Google Inc., Mountain View, CA (US)

( * ) Notice: Subject to any disclaimer, the term of this patent is extended or adjusted under 35 U.S.C. 154(b) by 668 days.

(21) Appl. No.: 13/566,793

(22) Filed: Aug. 3, 2012

(51) Int. Cl.
*G06F 17/30* (2006.01)

(52) U.S. Cl.
CPC .................. *G06F 17/30321* (2013.01)

(58) Field of Classification Search
None
See application file for complete search history.

(56) References Cited

U.S. PATENT DOCUMENTS

| | | | |
|---|---|---|---|
| 6,169,989 B1 * | 1/2001 | Eichstaedt et al. | 1/1 |
| 8,812,612 B1 * | 8/2014 | Laier et al. | 709/213 |
| 8,819,335 B1 * | 8/2014 | Salessi et al. | 711/103 |
| 2011/0022601 A1 * | 1/2011 | Elrom et al. | 707/747 |
| 2011/0302583 A1 * | 12/2011 | Abadi et al. | 718/102 |
| 2013/0219394 A1 * | 8/2013 | Goldman et al. | 718/100 |
| 2013/0290979 A1 * | 10/2013 | Kawano et al. | 718/104 |
| 2014/0133312 A1 * | 5/2014 | Nakadai et al. | 370/238 |
| 2014/0330785 A1 * | 11/2014 | Isherwood et al. | 707/640 |

* cited by examiner

*Primary Examiner* — Robert Beausoliel, Jr.
*Assistant Examiner* — Susan F Rayyan
(74) *Attorney, Agent, or Firm* — Fish & Richardson P.C.

(57) ABSTRACT

A method for shard assignment in a large-scale data processing job is provided. Datasets are divided into a plurality of shards and the shards are indexed and aggregated into one or more groups. A worker process is initially assigned an indexed shard from a group. The initial assignment can assigned based on a simple algorithm. The worker's subsequent shard assignment is based on the index of the initially assigned shard.

21 Claims, 8 Drawing Sheets

METHOD FOR SHARD ASSIGNMENT IN A LARGE-SCALE DATA PROCESSING JOB

BACKGROUND

Large-scale data processing may include extracting records from data blocks within datasets and processing them into key/value pairs. The implementation of large-scale data processing may include the distribution of data and computations among multiple disks and processors to make use of aggregate storage space and computing power. A parallel processing system may include one or more processing devices and one or more storage devices. Storage devices may store instructions that, when executed by the one or more processing devices, implement a set of map processes and a set of reduce processes.

A master-worker design pattern may be used for large-scale data processing. This pattern consists of a work job master (master) and one or more worker instances. The master takes a data processing job and divides it into smaller tasks which are managed by the worker processes.

FIG. 1 illustrates a master-worker distributed system as discussed above. In the system, a master (120) assigns application-specific data processing tasks to workers (104, 170). A given worker performs its assigned task and notifies the master when the task is complete at which point, the master may assign a new task to the worker. The system receives a data set as input (102), divides the data set into data blocks (101), performs application-specific tasks, and produces final output files (110a, 110n). The system as depicted in FIG. 1 is commonly referred to as the MapReduce model.

A parallel data processing system, such as MapReduce, receives a dataset as input and divides the dataset into data blocks called shards. The system may then decide which shard to give to a specific worker in a step referred to as shard assignment.

A goal of shard assignment is to assign a shard to a worker so that the processing of the shard incurs a minimum amount of overhead in terms of time and computational resources. In addition, inefficient assignment algorithms can result in master failure due to CPU and/or memory overload in large-scale systems. Therefore, since shard assignment is typically carried out at the master, the efficiency of the assignment algorithm should be considered in a large-scale processing job.

SUMMARY

This specification describes technologies relating parallel processing of data, and specifically to a system and a computer-implemented method for parallel processing of data that improves data assignment by grouping data and assigning a worker data from the same group.

In general, one aspect of the subject matter described in this specification can be embodied in a system and method for shard assignment in a distributed data processing system. An exemplary system includes: one or more processing devices; one or more storage devices storing instruction that, when executed by the one or more processing devices, case the one or more processing devices to implement: a plurality of worker processes and a master process for coordinating a data processing job that: divides an input dataset into a plurality of shards; indexes the plurality of shards; aggregates the plurality of shards into one or more groups based on the shards' indices; initially assigns an indexed shard from each group to a worker process; and assigns subsequent shards to a worker process based on the index of the previously-assigned shard. An exemplary method includes: dividing an input dataset into a plurality of shards; indexing the plurality of shards; aggregating the plurality of shards into one or more groups based on the shards' indices; initially assigning an indexed shard from each group to a worker process; and assigning subsequent shards to a worker.

These and other embodiments can optionally include one or more of the following features: (1) indexing the plurality of shards, aggregating the shards into one or more groups, and initially assigning an indexed shard from each group to a worker process may include sequentially indexing the plurality of shards; aggregating the plurality of shards into one or more groups based on the shards' indices; identifying one or more of the indexed shards as seed shard; and initially assigning the one or more seed shards to one or more worker processes; (2) initially assigning the one or more seed shards to a worker process may include using a simple indexing algorithm to choose the seed shard; (3) data within a group may be indexed contiguously; (4) assigning subsequent shards to a worker may include receiving an indication of the index of the previously-received shard form the worker and assigning a subsequent indexed shard based on the received index; (5) the input dataset may include data from a plurality of input data files and indexing the plurality of shards, aggregating the shards into one or more groups, and initially assigning an indexed shard from each group to a worker process may include sequentially indexing shards from the same data file; aggregating the shards into one or more groups based on the shards' indices; identifying the first shard from each data file as a seed shard; and assigning each of the seed shards to a worker process; and (6) initially assigning the indexed shard to a worker process may include matching region information between a shard and worker process when shards and worker processes are in different data centers.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

An exemplary shard assignment method has several advantages over customary shard assignments including: (1) the method attempts to assign a shard to a worker that incurs a minimum amount of overhead for the worker to process the next shard; (2) the method attempts to assign a shard to a nearby worker in terms of region, incurring a minimum amount of data movement overhead; and (3) the method is highly efficient, requiring only a small amount of CPU and memory overhead at the master, which makes the algorithm suitable to be carried out at the single-process master.

In an exemplary embodiment, a plurality of shards is indexed into one or more groups and the indexed shards are assigned to worker processes. A worker's subsequent shard assignments are based on the index of its previously-assigned shard.

Figure 1:
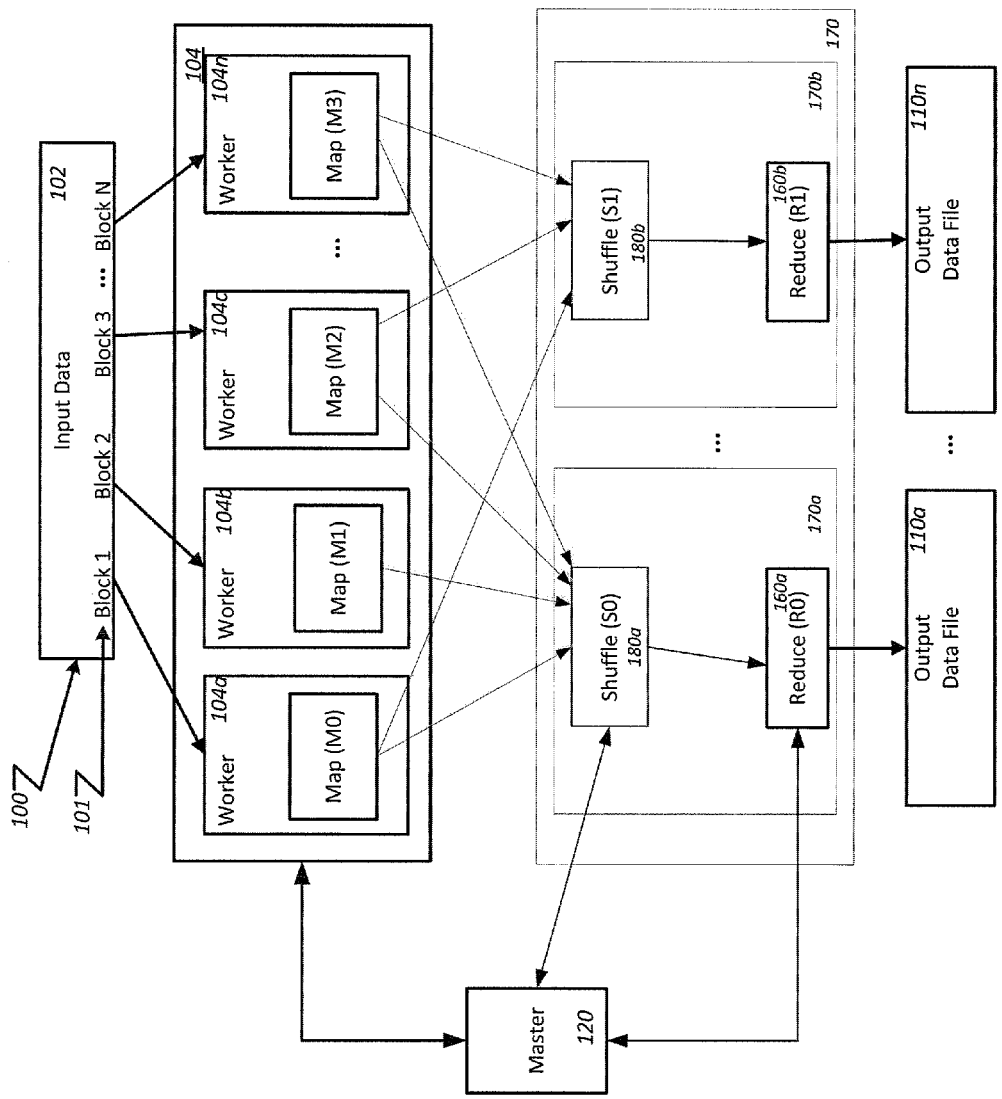
FIG. 1 is a block diagram illustrating an exemplary parallel data processing system.
Figure 2:
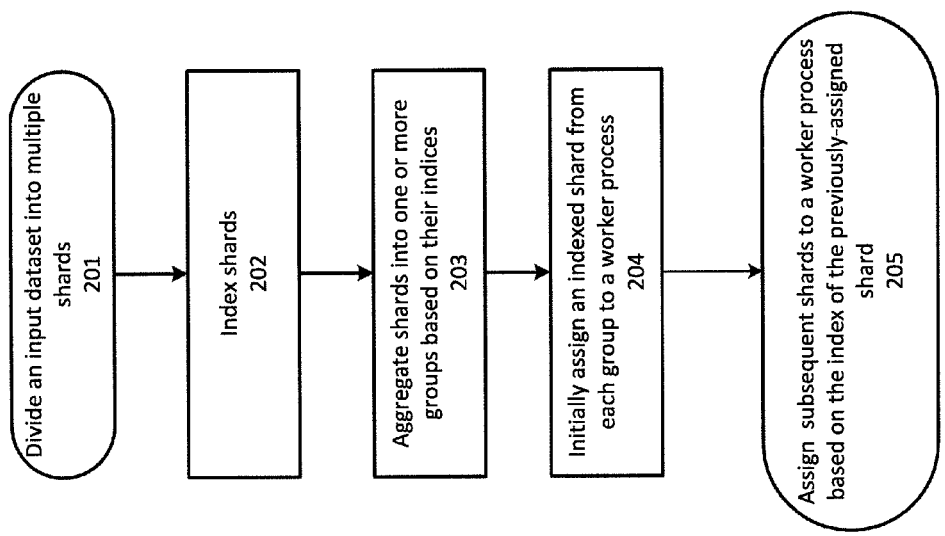
FIG. 2 is a flow diagram of an exemplary method for shard assignment in a large-scale data processing job.

A shard assignment method according to aspects of the inventive concepts may begin by dividing an input dataset into multiple shards as depicted in FIG. 2 (201). An input dataset may contain several files which may be fairly large. For example, a data processing system may have ten (10) files each of which is approximately 1028 MB in size as input for a particular data processing job. In order to process these files, the files are considered to form one big chunk of data. This data may then be divided into shards of a size specified by the user application or a default size specified by the data processing system. The shards may subsequently be numbered or indexed sequentially and aggregated into multiple groups based on their indices (202, 203).

A new worker in a data processing job, one that has not yet processed shards for the data processing job, may be assigned a numbered or indexed shard from a group (204). The worker will subsequently be assigned shards from that same group in sequential order of the indices if the group has remaining shards that need to be processed (205).

Figure 3:
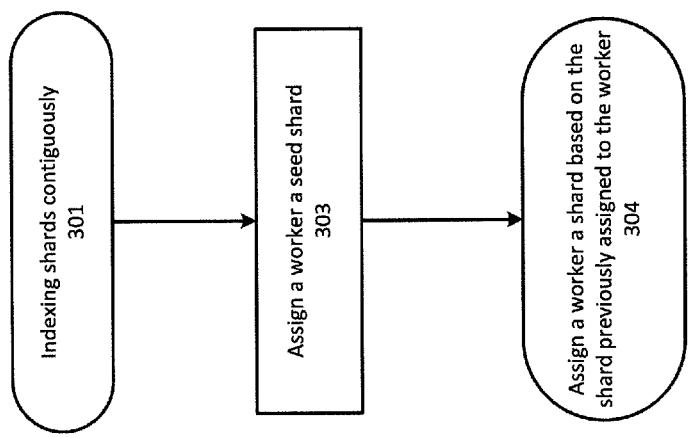
FIG. 3 is a flow diagram of an exemplary method for shard assignment in a large-scale data processing job.

In another embodiment which shows a specific example of aspects of the inventive concepts, a seed shard is assigned to a worker as an initial shard assignment. Consecutive shards are then assigned to the worker during future shard assignments. In an exemplary embodiment as illustrated in FIG. 3, shard assignment may begin with indexing shards contiguously, meaning that shards belonging to the same file are indexed next to each other (301).

A new worker that has not yet processed shards in the data processing job is assigned a "seed shard" (303) to give the worker initial data on which to work. The worker is then assigned a subsequent shard based on the index of the worker's seed shard (304).

Figure 4:
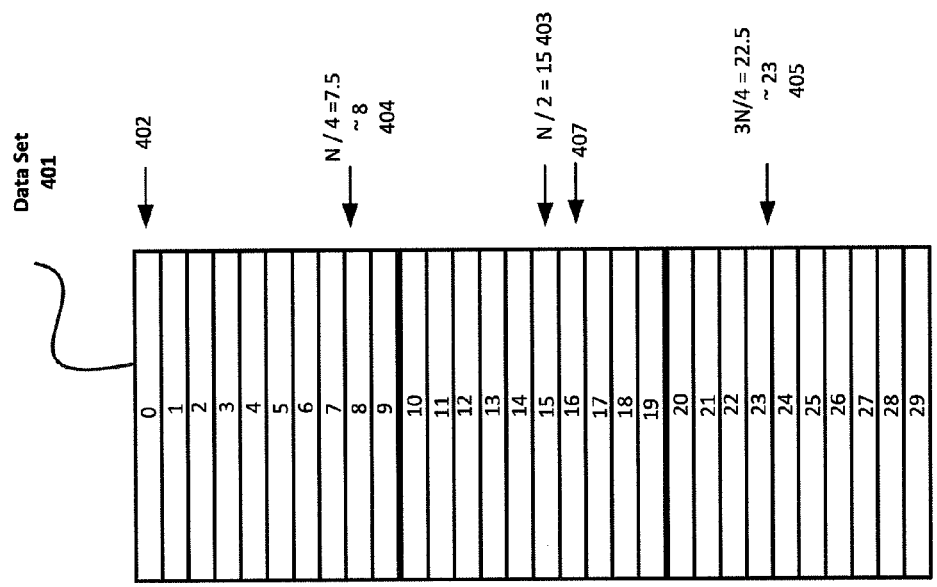
FIG. 4 is a block diagram illustrating exemplary seed shards in an exemplary parallel data processing system.

A seed shard may be one of several shards in a dataset. For example, if a dataset contains shards that are indexed from 0 to N, the seed shards may be shards 0, N/2, N/4, 3N/4, N/8, 3N/8, 5N/8, or 7N/8 for example. FIG. 4 illustrates a dataset (401) that is divided into thirty shards. The shards are indexed contiguously. The seed shards for this dataset may be shard 0 (402), or shard 15 (N/2) (403) for example. In some instances, the number of seeds is based on the number of new workers available. Because the number of workers may not be known in advance, the seed shards may be generated efficiently using a simple algorithm. An advantage of assigning a seed shard via this method is that there is an attempt to assign a sequence of shards of roughly similar lengths to all workers without having to know the number of workers in advance. Because the number of total workers in a particular data processing job is unknown in advance of starting the data processing job, the whole shard sequence cannot be simply partitioned by the number of participating workers.

When the master needs to generate the next seed shard to be given to a worker, the master may run an algorithm. An exemplary algorithm that generates the next seed shard may keep track of the current seed shard and a delta which is a number that describes how many positions the next seed shard is from the current seed shard. When the next seed shard is out of range of the available shards, the algorithm shrinks the delta and moves the current seed shard closer to the start of the range. Then another round of iteration is started.

Figure 5:
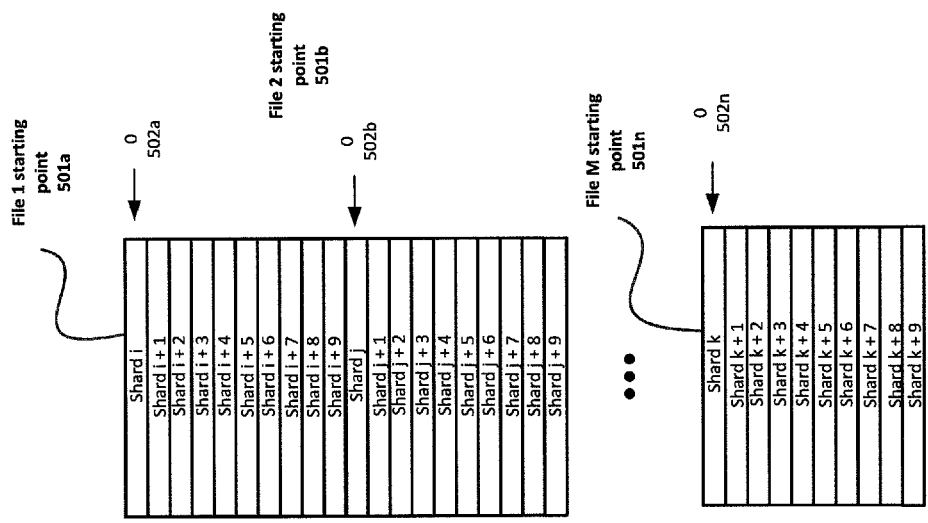
FIG. 5 is a block diagram illustrating exemplary seed shards in an exemplary parallel data processing system.

Another way to perform seed assignment is to define a seed shard to be the first shard in an input file as shown in FIG. 5. By defining seed shards as the first shards of input files (502*a* . . . 502*n*), it is less likely that a worker will cross a file boundary and need to obtain file-related meta-data when processing a consecutive sequence of shards. This method does incur more overhead for the master than indexing the shards and generating a sequence.

Although this specification discusses in detail two specific ways to choose a seed shard, there may be more methods for selecting a seed shard.

Figure 6:
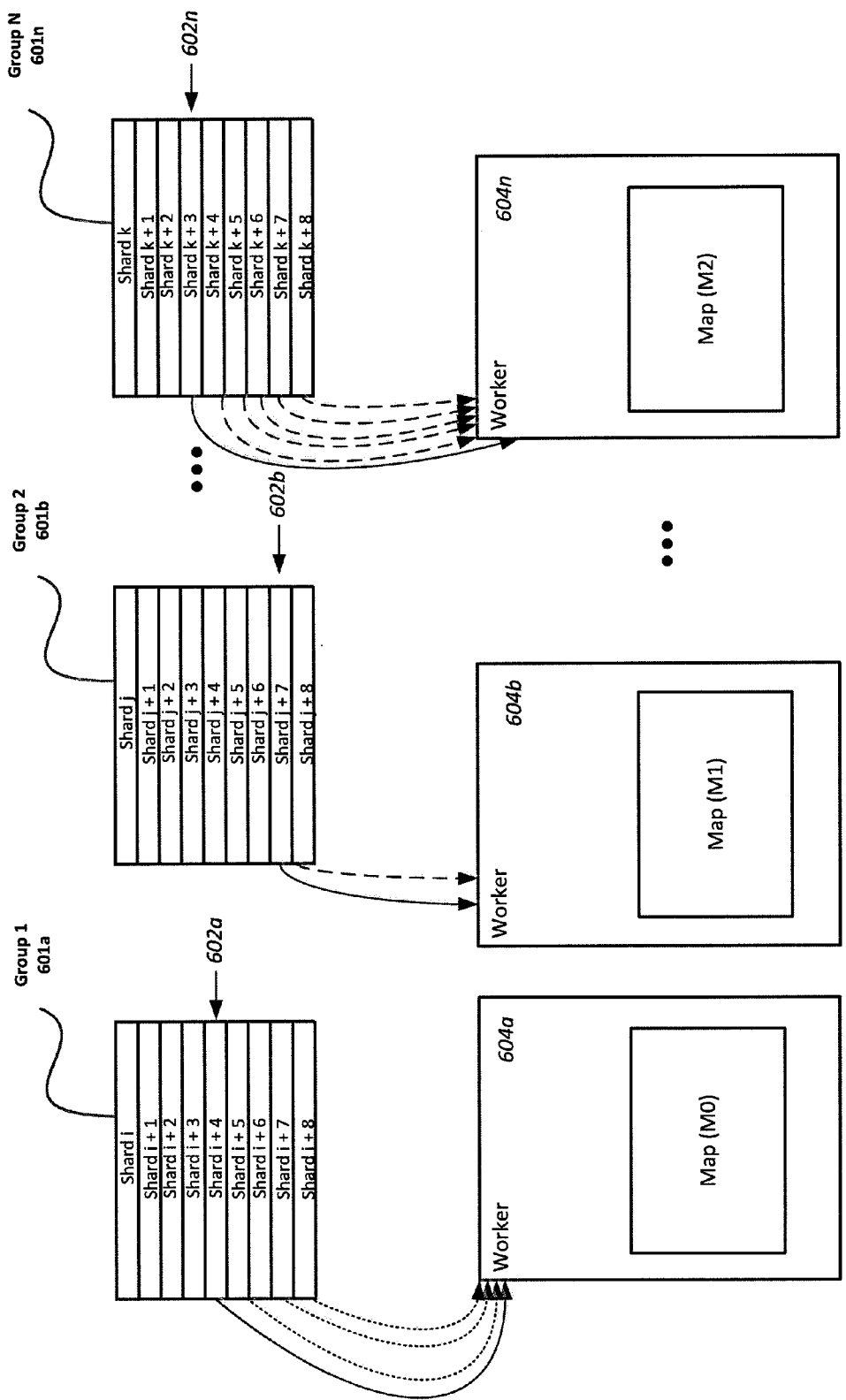
FIG. 6 is a block diagram illustrating exemplary shard assignment in an exemplary data processing system.

When a worker has completed processing of a seed shard, the worker is assigned a subsequent shard based on the index of the worker's most recently completed or processed shard. For example, if a worker (604*a*), as shown in FIG. 6, was assigned seed shard 602*a*, an exemplary method may try to assign that worker (604*a*) shard 603*a* to process if shard 603*a* is still available. This process is called consecutive shard assignment. The master tries to assign a worker a shard that is 1 greater in index from the shard that the worker previously processed. Generically, when the worker (604*a*) has finished processing shard i, the process assigns shard i+1 to the worker (604*a*) if shard i+1 is available. The master determines shard i+1 based on the value of the last shard that the worker requesting work (604*a*) has finished processing. Shard i+1 may be unavailable because it has been assigned to another worker. For example, a data processing job may have ten (10) shards to process, shards 0-9. There may be two workers (604*a*, 604*b*) to process the ten shards. Shard 0 may be assigned to worker 604*a* and shard 5 may be assigned to worker 604*b*. Worker 604*a* may process shards 0-4 quickly and be ready to process another shard before worker 604*b* is finished processing shard 5. However, when worker 604*a* requests another shard to process from the master, shard 5 is unavailable because it has been assigned to worker 604*b*. If shard i+1 is unavailable, the process tries to assign the worker 604*a* a shard that is located in the same datacenter as the worker 604*a* since the master may maintain information regarding the datacenters and regions to which workers and shards belong.

Figure 7:
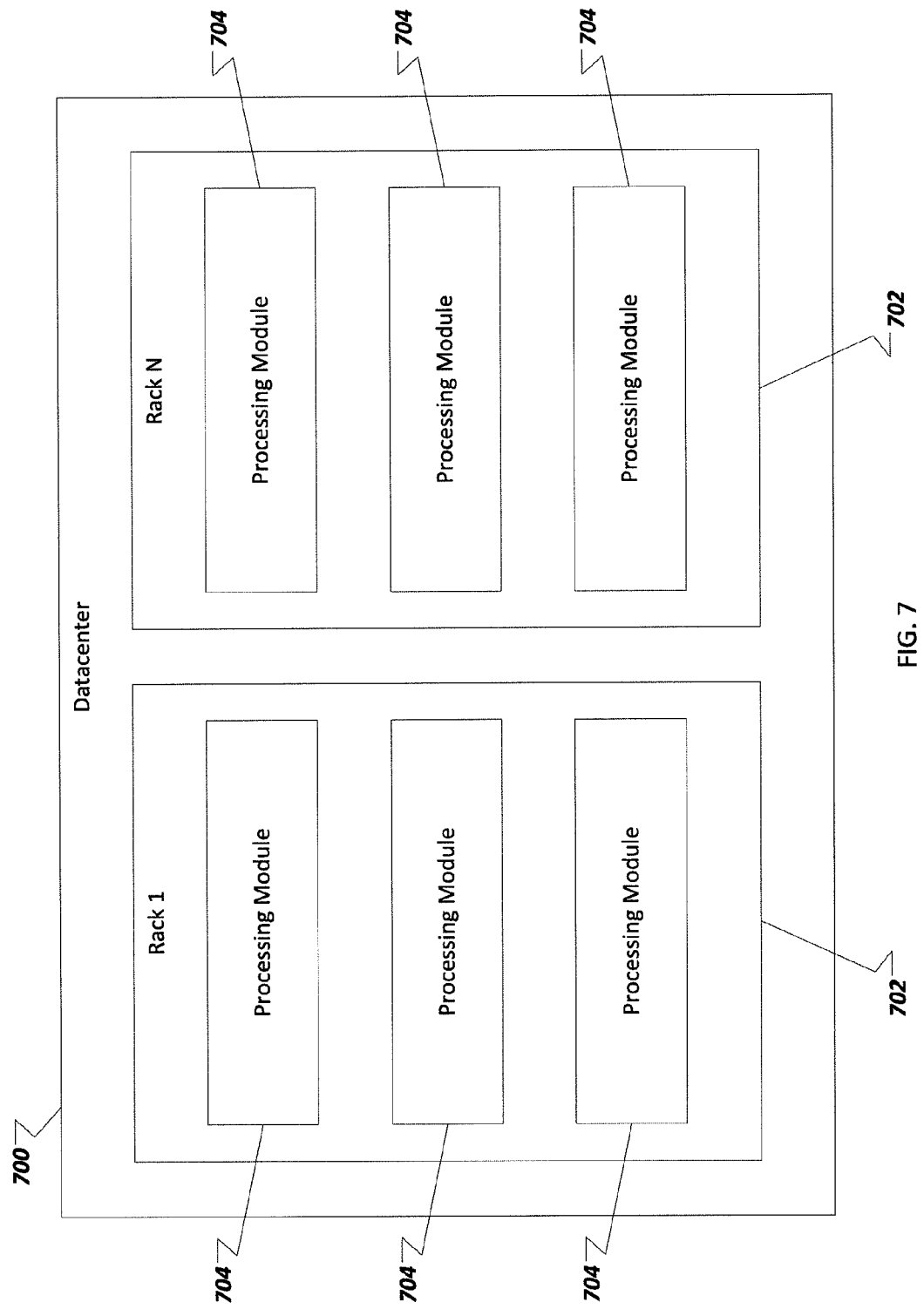
FIG. 7 is a block diagram illustrating an example of a data center.

FIG. 7 is a block diagram illustrating an example of a datacenter (700) where shard assignments in large-scale data processing jobs may be performed. The data center (700) is used to store data, perform computational tasks, and transmit data to other systems outside of the datacenter using, for example, a network connected to the datacenter. In particular, the datacenter (700) may perform large-scale data processing on massive amounts of data.

The datacenter (700) includes multiple racks (702). While only two racks are shown, the datacenter (700) may have many more racks. Each rack (702) can include a frame or cabinet into which components, such as processing modules (704), are mounted. In general, each processing module (704) can include a circuit board, such as a motherboard, on which a variety of computer-related components are mounted to perform data processing. The processing modules (704) within each rack (702) are interconnected to one another through, for example, a rack switch, and the racks (702) within each datacenter (700) are also interconnected through, for example, a datacenter switch.

In some implementations, the processing modules (704) may each take on a role as a master or worker. The master modules control scheduling and data distribution tasks among themselves and the workers. A rack can include storage, like one or more network attached disks, that is shared by the one or more processing modules (704) and/or each processing module (704) may include its own storage. Additionally, or alternatively, there may be remote storage connected to the racks through a network.

The datacenter (700) may include dedicated optical links or other dedicated communication channels, as well as supporting hardware, such as modems, bridges, routers, switches, wireless antennas and towers. The datacenter (700) may include one or more wide area networks (WANs) as well as multiple local area networks (LANs).

As noted above, the master may maintain information regarding the datacenters and regions to which workers and shards belong. If there are no shards in the same datacenter, the process tries to assign the worker 604a a shard that is located in a datacenter nearby the worker. The process may alternatively try to assign the worker another seed shard.

In some embodiments, data processing jobs may span multiple datacenters. The consecutive assignment method can be further refined for these jobs. In a MapReduce job, inputs consist of multiple, large files. These files are further divided into shards. In a multi-datacenter job, input data files can be located in different datacenters. Files and shards can be sorted based on their datacenters so that if a consecutive assignment crosses the file boundary, the newly assigned shard is still likely to be in the same datacenter as the old shard. Alternatively, the master could assign a new seed shard once it realizes that the consecutive assignment crosses the file boundary. In a multi-datacenter job, assigning a seed shard requires attention because, for example, it is possible, yet undesirable to assign a seed shard to a worker where the seed shard is located across the ocean from the worker. Instead of simply choosing a shard based on a simple algorithm when assigning a seed shard, a master may take into account the datacenter or region of the worker and assign a seed shard that is in the same datacenter or region as the worker.

Figure 8:
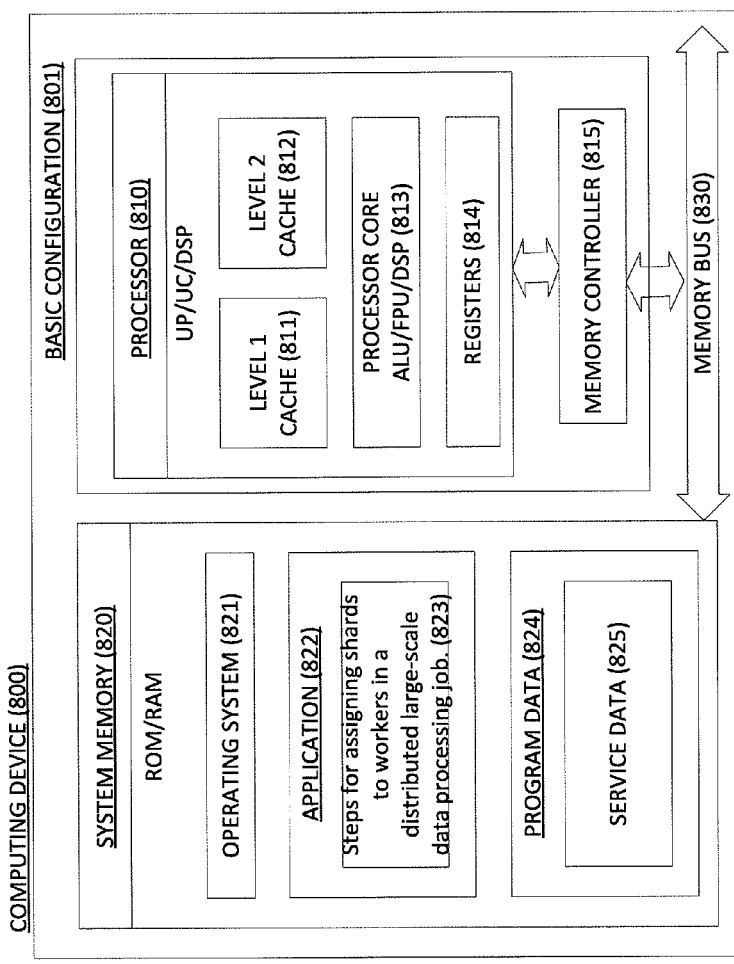
FIG. 8 is a block diagram illustrating an exemplary computing device.

FIG. 8 is a block diagram illustrating an example computing device (800) that is arranged for parallel processing of data and may be used for one or more of the processing modules (704) in a datacenter. In a very basic configuration (801), the computing device (800) typically includes one or more processors (810) and system memory (820). A memory bus (830) can be used for communicating between the processor (810) and the system memory (820).

Depending on the desired configuration, the processor (810) can be of any type including but not limited to a microprocessor (µP), a microcontroller (µC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (810).

Depending on the desired configuration, the system memory (820) can be of any type including but not limited to volatile memory (804) (such as RAM), non-volatile memory (803) (such as ROM, flash memory, etc.) or any combination thereof. System memory (820) typically includes an operating system (821), one or more applications (822), and program data (824). The application (822) may include steps for assigning shards to workers in a distributed large-scale data processing job. Program Data (824) includes storing instructions that, when executed by the one or more processing devices, implement the system for assigning shards to workers in a large-scale data processing job. In some embodiments, the application (822) can be arranged to operate with program data (824) on an operating system (821).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for shard assignment in a distributed data processing system, the system comprising:
   one or more processing devices;
   one or more storage devices storing instructions that, when executed by the one or more processing devices, cause the one or more processing devices to implement:
   a plurality of worker processes and
   a master process for coordinating a data processing job that:
   divides an input dataset into a plurality of shards;
   indexes the plurality of shards;
   aggregates the plurality of shards into one or more groups based on the shards' indices;
   initially assigns an indexed shard from each group to a worker process; and
   in response to a worker having processed its initially assigned indexed shard, assigns subsequent shards from the same group as the initially assigned shard to the worker process based on the index of the previously-assigned shard.

2. The system of claim 1, wherein indexing the plurality of shards, aggregating the shards into one or more groups, and initially assigning an indexed shard from each group to a worker process comprises:
   sequentially indexing the plurality of shards;
   aggregating the plurality of shards into one or more groups based on the shards' indices;
   identifying one or more of the indexed shards as a seed shard; and
   initially assigning the one or more seed shards to one or more worker processes.

3. The system of claim 1, wherein assigning subsequent shards to a worker comprises:
   receiving an indication of the index of the previously-received shard from the worker and
   assigning a subsequent indexed shard based on the received index.

4. The system of claim 1, wherein the input dataset includes data from a plurality of input data files, and wherein indexing the plurality of shards, aggregating the shards into one or more groups and initially assigning an indexed shard from each group to a worker process comprises:
   sequentially indexing shards from the same data file;
   aggregating the shards into one or more groups based on the shards' indices;
   identifying the first shard from each data file as a seed shard; and
   assigning each of the seed shards to a worker process.

5. The system of claim 1, wherein data within a group is indexed contiguously.

6. The system of claim 2, wherein initially assigning the one or more seed shards to a worker process includes using a simple indexing algorithm to choose the seed shard.

7. A computer-implemented method for shard assignment in a distributed data processing system, comprising:
   dividing an input dataset into a plurality of shards;
   indexing the plurality of shards;
   aggregating the plurality of shards into one or more groups based on the shards' indices;
   initially assigning an indexed shard from each group to a worker process; and
   in response to a worker having processed its initially assigned indexed shard, assigning subsequent shards from the same group as the initially assigned shard to the worker based on the index of the previously-assigned shard.

8. The computer-implemented method of claim 7, wherein indexing the plurality of shards, aggregating the plurality of shards into one or more groups, and initially assigning an indexed shard from each group to a worker process comprises:
   sequentially indexing the plurality of shards;
   aggregating the plurality of shards into one or more groups based on the shards' indices;
   identifying one or more of the indexed shards as a seed shard; and
   initially assigning the one or more seed shards to one or more worker processes.

9. The computer-implemented method of claim 7, wherein assigning subsequent shards to a worker comprises:
   receiving an indication of the index of the previously received shard from the worker and
   assigning a subsequent indexed shard based on the received index.

10. The computer-implemented method of claim 7, wherein the input dataset includes data from a plurality of input data files, and wherein indexing the plurality of shards and aggregating the shards into one or more groups comprises:
    sequentially indexing shards from the same data file;
    aggregating shards into one or more groups based on the shards' indices;
    identifying the first shard from each data file as a seed shard; and
    assigning each of the seed shards to a worker process.

11. The computer-implemented method of claim 7, wherein data within a group is indexed contiguously.

12. The computer-implemented method of claim 8, wherein initially assigning the one or more seed shards to a worker process includes using a simple indexing algorithm to choose the seed shard.

13. A non-transitory computer-readable medium having stored therein computer executable code that causes one or more processors to execute the steps of:
    dividing an input dataset into a plurality of shards;
    indexing the plurality of shards;
    aggregating the plurality of shards into one or more groups based on the shards' indices;
    initially assigning an indexed shard from each group to a worker process; and
    in response to a worker having processed its initially assigned indexed shard, assigning subsequent shards from the same group as the initially assigned shard to the to a-worker based on the index of the previously-assigned shard.

14. The non-transitory computer-readable medium of claim 13, wherein indexing the plurality of shards, aggregating the plurality of shards into one or more groups, and initially assigning an indexed shard from each group to a worker process comprises:
- sequentially indexing the plurality of shards;
- aggregating the plurality of shards into one or more groups based on the shards' indices;
- identifying one or more of the indexed shards as a seed shard;
- initially assigning the one or more seed shards to one or more worker processes.

15. The non-transitory computer-readable medium of claim 13, wherein assigning subsequent shards to a worker comprises:
- receiving an indication of the index of the previously-received shard from the worker and
- assigning a subsequent indexed shard based on the received index.

16. The non-transitory computer-readable medium of claim 13, wherein the input dataset includes data from a plurality of input data files, and wherein indexing the plurality of shards and aggregating the shards into one or more groups comprises:
- sequentially indexing shards from the same data file;
- aggregating the shards into one or more groups based on the shards' indices;
- identifying the first shard from each data file as a seed shard; and
- assigning each of the seed shards to a worker process.

17. The non-transitory computer-readable medium of claim 13, wherein data within a group is indexed contiguously.

18. The non-transitory computer-readable medium of claim 14, wherein initially assigning the one or more seed shards to a worker process includes using a simple indexing algorithm to choose the seed shard.

19. The system of claim 1, wherein initially assigning the indexed shard to a worker process includes matching region information between a shard and a worker process when shards and worker processes are in different data centers.

20. The computer-implemented method of claim 7, wherein initially assigning the indexed shard to a worker process includes matching region information between a shard and a worker process when shards and worker processes are in different data centers.

21. The non-transitory computer-readable medium of claim 13, wherein initially assigning the indexed shard to a worker process includes matching region information between a shard and a worker process when shards and worker processes are in different data centers.

* * * * *